United States Patent
Zhang et al.

(10) Patent No.: US 8,625,554 B2
(45) Date of Patent: Jan. 7, 2014

(54) SYSTEM AND METHOD FOR UPLINK DATA AND CONTROL SIGNAL TRANSMISSION IN MIMO WIRELESS SYSTEMS

(75) Inventors: Jianzhong Zhang, Irving, TX (US); Jin-Kyu Han, Seoul (KR); Young-Han Nam, Richardson, TX (US); Juho Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 968 days.

(21) Appl. No.: 12/641,951

(22) Filed: Dec. 18, 2009

(65) Prior Publication Data

US 2010/0195624 A1 Aug. 5, 2010

Related U.S. Application Data

(60) Provisional application No. 61/206,455, filed on Jan. 30, 2009.

(51) Int. Cl.
*H04W 4/00* (2009.01)
*H04K 1/10* (2006.01)
*H04L 27/28* (2006.01)

(52) U.S. Cl.
USPC .......................................... 370/338; 375/260

(58) Field of Classification Search
USPC .................................. 370/310–338; 375/260
See application file for complete search history.

(56) References Cited

U.S. PATENT DOCUMENTS

| | | | |
|---|---|---|---|
| 2008/0049706 A1* | 2/2008 | Khandekar et al. | 370/342 |
| 2009/0168731 A1* | 7/2009 | Zhang et al. | 370/336 |
| 2010/0002575 A1* | 1/2010 | Eichinger et al. | 370/210 |
| 2010/0039928 A1* | 2/2010 | Noh et al. | 370/210 |
| 2011/0122819 A1* | 5/2011 | Jongren et al. | 370/328 |
| 2011/0134849 A1* | 6/2011 | Lee et al. | 370/328 |
| 2012/0082117 A1* | 4/2012 | Lee et al. | 370/329 |

* cited by examiner

*Primary Examiner* — Xavier Szewai Wong

(57) ABSTRACT

A mobile station includes a transmission chain capable of communicating via an uplink transmission to at least one base station in a Multiple Input Multiple Output wireless network. The mobile station includes a plurality of transmit antenna and a transmitter coupled to the plurality of transmit antenna. The transmitter includes a layer mapper that maps data and uplink control information to at least one layer. The mapping is performed prior to Discrete Fourier Transform precoding such that the data and uplink control information are multiplexed and interleaved. The transmitter is configured to simultaneously transmit the data and uplink control information on at least one of a plurality of transmission layers.

16 Claims, 8 Drawing Sheets

SYSTEM AND METHOD FOR UPLINK DATA AND CONTROL SIGNAL TRANSMISSION IN MIMO WIRELESS SYSTEMS

CROSS-REFERENCE TO RELATED APPLICATION(S) AND CLAIM OF PRIORITY

The present application is related to U.S. Provisional Patent No. 61/206,455, filed Jan. 30, 2009, entitled "UPLINK DATA AND CONTROL SIGNAL TRANSMISSION IN MIMO WIRELESS SYSTEMS". Provisional Patent No. 61/206,455 is assigned to the assignee of the present application and is hereby incorporated by reference into the present application as if fully set forth herein. The present application hereby claims priority under 35 U.S.C. §119(e) to U.S. Provisional Patent No. 61/206,455.

TECHNICAL FIELD OF THE INVENTION

The present application relates generally to wireless communications networks and, more specifically, to data and control signal transmissions in a wireless communication network.

BACKGROUND OF THE INVENTION

Modern communications demand higher data rates and performance. Multiple input, multiple output (MIMO) antenna systems, also known as multiple-element antenna (MEA) systems, achieve greater spectral efficiency for allocated radio frequency (RF) channel bandwidths by utilizing space or antenna diversity at both the transmitter and the receiver, or in other cases, the transceiver.

In MIMO systems, each of a plurality of data streams is individually mapped and modulated before being precoded and transmitted by different physical antennas or effective antennas. The combined data streams are then received at multiple antennas of a receiver. At the receiver, each data stream is separated and extracted from the combined signal. This process is generally performed using a minimum mean squared error (MMSE) or MMSE-successive interference cancellation (SIC) algorithm.

SUMMARY OF THE INVENTION

A mobile station capable of communicating via an uplink transmission to at least one base station in a Multiple Input Multiple Output wireless network is provided. The mobile station includes a plurality of transmit antenna and a transmitter coupled to the plurality of transmit antenna. The transmitter includes a layer mapper that maps data and uplink control information to at least one layer. The mapping is performed prior to Discrete Fourier Transform precoding such that the data and uplink control information are multiplexed and interleaved. The transmitter is configured to simultaneously transmit the data and uplink control information on at least one of a plurality of transmission layers.

An apparatus capable of communicating via an uplink transmission in a Multiple Input Multiple Output wireless network is provided. The apparatus includes a Discrete Fourier Transform (DFT) precoder; and a layer mapper. The layer mapper is configured to map data and uplink control information to at least one layer. The mapping is performed prior to DFT precoding by the DFT precoder such that the data and uplink control information are multiplexed and interleaved. The apparatus is configured to simultaneously transmit the data and uplink control information on at least one of a plurality of transmission layers.

A method for communicating uplink control information via an uplink transmission in a Multiple Input Multiple Output wireless network is provided. The method includes mapping data and uplink control information to at least one layer. The mapping is performed prior to DFT precoding such that the data and uplink control information are multiplexed and interleaved. The method also includes simultaneously transmitting the data and uplink control information on at least one of a plurality of transmission layers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

With regard to the following description, it is noted that the 3GPP Long Term Evolution (LTE) term "node B" is another term for "base station" used below. Also, the LTE term "user equipment" or "UE" is another term for "subscriber station" (or "SS") used below.

Figure 1:
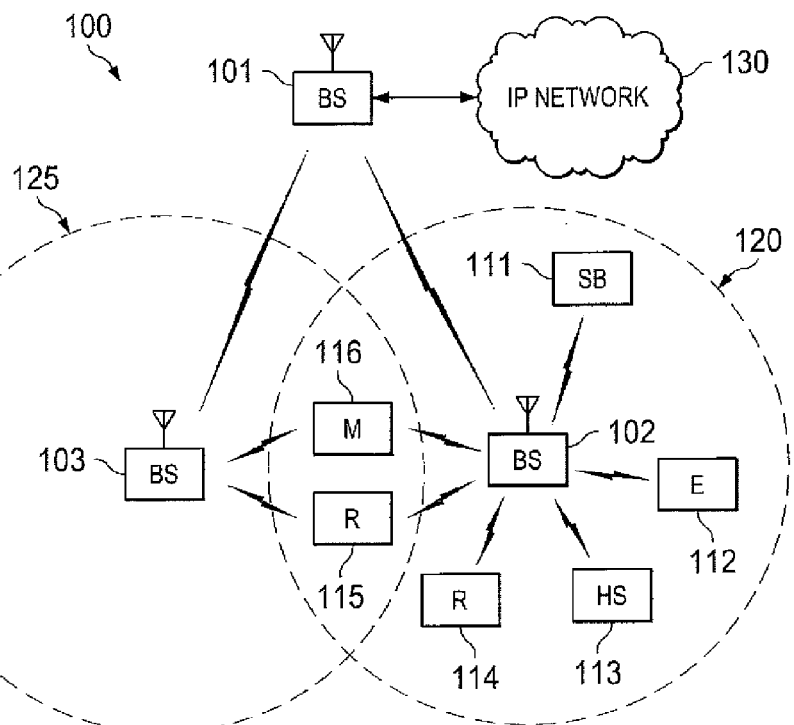
FIG. 1 illustrates an Orthogonal Frequency Division Multiple Access (OFDMA) wireless network that is capable of decoding data streams according to one embodiment of the present disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2A:
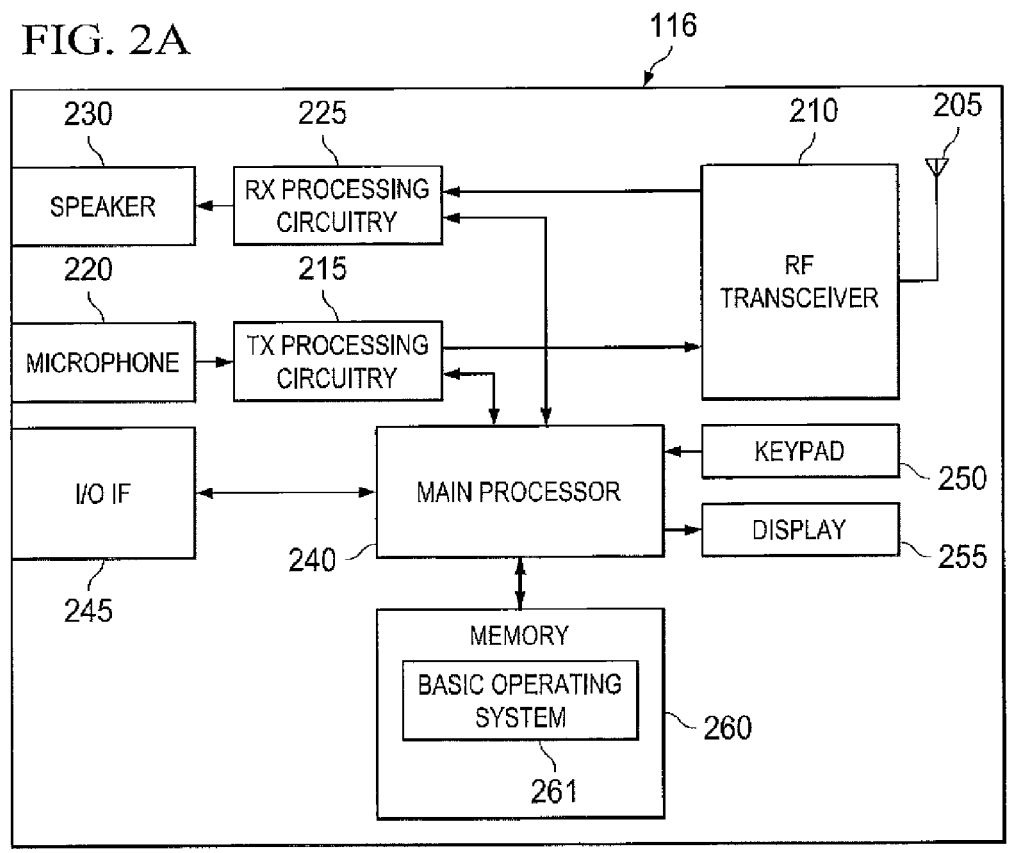
FIG. 2A illustrates an exemplary wireless mobile station according to embodiments of the present disclosure.

FIG. 2A illustrates an exemplary wireless subscriber station according to embodiments of the present disclosure. The embodiment of wireless subscriber station 116 illustrated in FIG. 2A is for illustration only. Other embodiments of the wireless subscriber station 116 could be used without departing from the scope of this disclosure.

Wireless subscriber station 116 comprises antenna 205, radio frequency (RF) transceiver 210, transmit (TX) processing circuitry 215, microphone 220, and receive (RX) processing circuitry 225. SS 116 also comprises speaker 230, main processor 240, input/output (I/O) interface (IF) 245, keypad 250, display 255, and memory 260. Memory 260 further comprises basic operating system (OS) program 261.

Radio frequency (RF) transceiver 210 receives from antenna 205 an incoming RF signal transmitted by a base station of wireless network 100. Antenna 205 can comprise a number (Nt) of antenna 205 (e.g., SS 116 includes Nt antenna 205). Radio frequency (RF) transceiver 210 down-converts the incoming RF signal to produce an intermediate frequency (IF) or a baseband signal. The IF or baseband signal is sent to receiver (RX) processing circuitry 225 that produces a processed baseband signal by filtering, decoding, and/or digitizing the baseband or IF signal. Receiver (RX) processing circuitry 225 transmits the processed baseband signal to speaker 230 (i.e., voice data) or to main processor 240 for further processing (e.g., web browsing).

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205.

In some embodiments of the present disclosure, main processor 240 is a microprocessor or microcontroller. Memory 260 is coupled to main processor 240. According to some embodiments of the present disclosure, part of memory 260 comprises a random access memory (RAM) and another part of memory 260 comprises a Flash memory, which acts as a read-only memory (ROM).

Main processor 340 executes basic operating system (OS) program 261 stored in memory 260 in order to control the overall operation of wireless subscriber station 116. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is capable of executing other processes and programs resident in memory 260. Main processor 240 can move data into or out of memory 260, as required by an executing process. Main processor 240 is also coupled to I/O interface 245. I/O interface 245 provides subscriber station 116 with the ability to connect to other devices such as laptop computers and handheld computers. I/O interface 245 is the communication path between these accessories and main controller 240.

Main processor 240 is also coupled to keypad 250 and display unit 255. The operator of subscriber station 116 uses keypad 250 to enter data into subscriber station 116. Display 255 may be a liquid crystal display capable of rendering text and/or at least limited graphics from web sites. Alternate embodiments may use other types of displays.

Figure 2B:
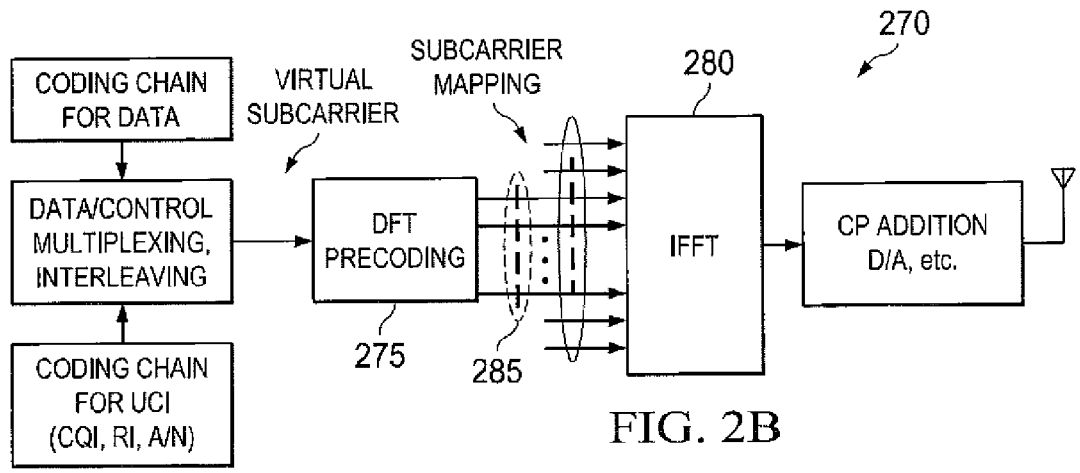
FIG. 2B illustrates a physical uplink shared channel transmission chain according to embodiments of the present disclosure.

FIG. 2B illustrates a Physical Uplink Shared Channel (PUSCH) transmission chain according to embodiments of the present disclosure. The embodiment of the PUSCH transmission chain 270 shown in FIG. 2B is for illustration only. Other embodiments could be used without departing from the scope of this disclosure.

The PUSCH transmission chain 270 is used for a single-carrier frequency division multiple access (SC-FDMA) Uplink (UL) transmission of data channel PUSCH. The PUSCH transmission chain 270 can comprise components or functions of one or more of antenna 205, RF Transceiver 210, RX Processing Circuitry 225, TX Processing circuitry 215, processor 240 and memory 260. The PUSCH transmission chain 270 includes a DFT precoder 275 (also referred herein as "DFT preceding block" 275) and an Inverse Fast Fourier Transform (IFFT) block 280. A subcarrier mapping step 285 (denoted by dotted circle) maps an output of the DFT precoder 275 to a contiguous set of subcarriers at the input of the IFFT 280. Typically, the size of IFFT 280 is greater than the size of DFT precoder 275. Further, in the conventional 3GPP LTE standard, the uplink transmission includes only one layer.

Figure 3:
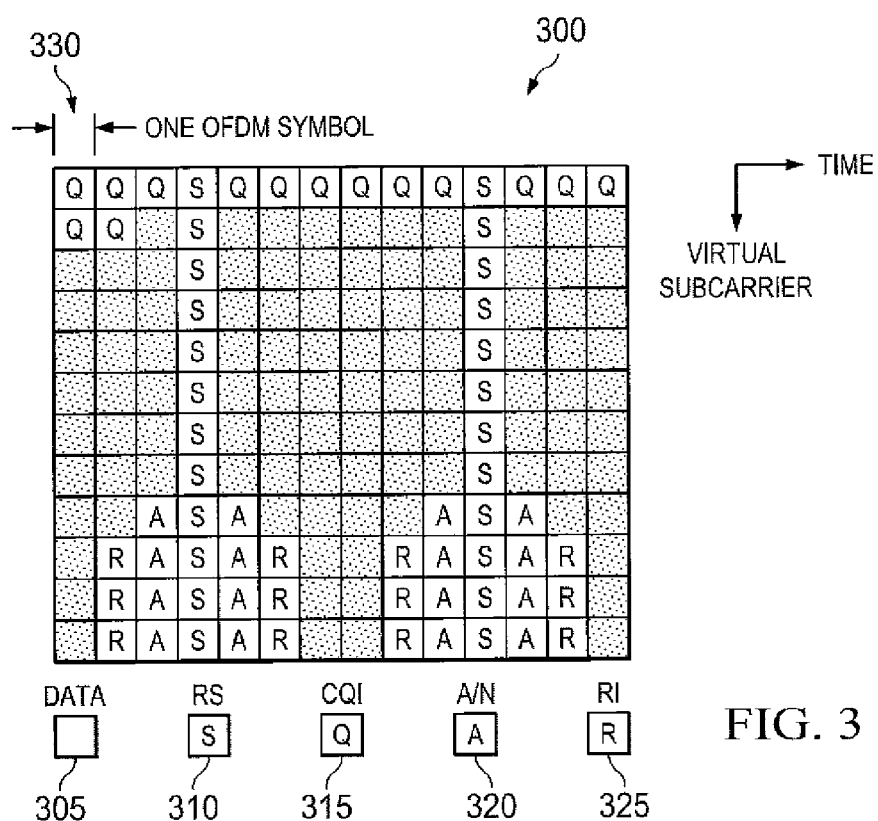
FIG. 3 illustrates a graph of data and control multiplexing in an LTE system according to embodiments of the disclosure.

FIG. 3 illustrates a graph of data and control multiplexing in an LTE system according to embodiments of the disclosure. The embodiment of the data and control multiplexing shown in FIG. 3 is for illustration only. Other embodiments could be used without departing from the scope of this disclosure.

One of the key component of this uplink transmission is the data/control multiplexing function, which is fully specified in 3GPP TS 36.212 v 8.5.0, "E-UTRA, Multiplexing and Channel coding", December 2008, the contents of which hereby are incorporated by reference in their entirety. This function is illustrated graphically in FIG. 3. The two dimensional grid 300 includes a number of data bits 305 (illustrated in the grid 300 c); a number of reference sequences 310 (illustrated in the grid 300 with an "S"); a number of Channel Quality Indices (CQI) 315 (illustrated in the grid 300 with a "Q"); a number of Acknowledgement/Negative Acknowledgement (ACK/NACK and/or A/N) bits 320 (illustrated in the grid 300 with an "A"); and a rank indicator 325 (illustrated in the grid 300 with an "R"). In the two dimensional grid 300, the output across all virtual subcarriers at a given OFDM symbol 330 in time is collected and sent to the DFT precoder 275.

Figure 4:
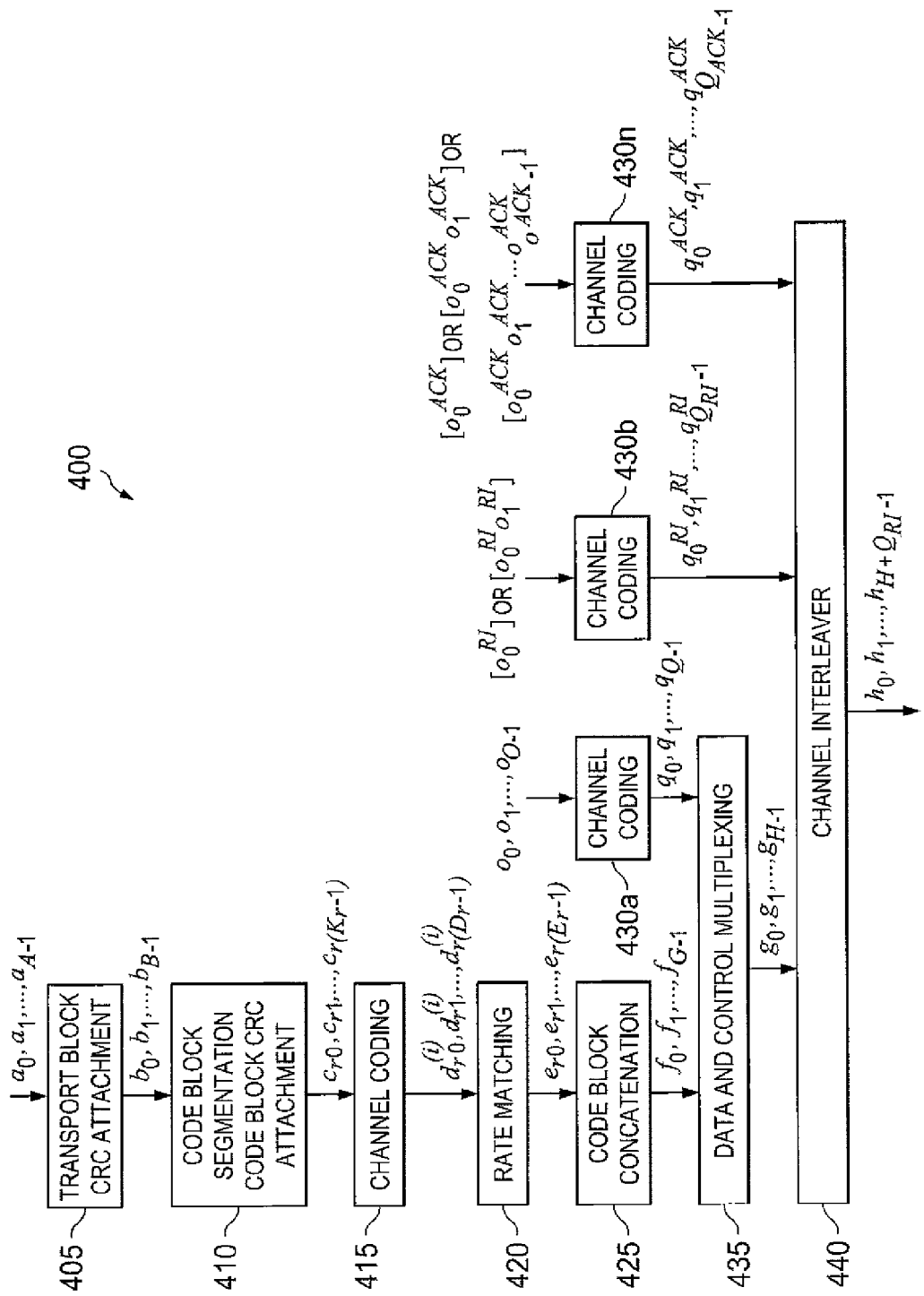
FIG. 4 illustrates transport channel processing for an uplink shared channel according to embodiments of the present disclosure.

FIG. 4 illustrates a diagram for transport channel processing according to embodiments of the present disclosure. The embodiment of the transport channel processing shown in FIG. 4 is for illustration only. Other embodiments could be used without departing from the scope of this disclosure.

The transport channel 400 includes an Add Cyclic Redundancy Check (CRC) block 405. The CRC block 405 performs error detection on Uplink-Shared Channel (UL-SCH) transport blocks through a CRC. The entire transport block can be used to calculate the CRC parity bits. The bits in a transport block delivered to layer 1 are denoted by $a_0, a_1, a_2, a_3, \ldots, a_{A-1}$. The parity bits are denoted by $p_0, p_1, p_2, p_3, \ldots, p_{L-1}$. A is the size of the transport block and L is the number of parity bits. The lowest order information bit $a_0$ can be mapped to the most significant bit of the transport block. The parity bits can be computed and attached to the UL-SCH transport block wherein L is set to 24 bits and using the generator polynomial $g_{CRC24A}(D)$.

The transport channel 400 also includes a Code block segmentation and code block CRC attachment 410. The bits input to the code block segmentation 410 are denoted by $b_0, b_1, b_2, b_3, \ldots, b_{B-1}$ where B is the number of bits in the transport block (including CRC). Code block segmentation and code block CRC attachment 410 are performed according to subclause 5.1.2 in 3GPP TS 36.212 v 8.5.0, "E-UTRA, Multiplexing and Channel coding", December 2008, the contents of which are incorporated by reference in its entirety. The bits after code block segmentation are denoted by $c_{r0}, c_{r1}, c_{r2}, c_{r3}, \ldots, c_{r(K_r-1)}$, where r is the code block number and $K_r$ is the number of bits for code block number r.

The transport channel 400 also includes a channel coding block 415 for coding of data and control information. Code blocks, from the Code block segmentation and code block CRC attachment 410, are delivered to the channel coding block 415. The bits in a code block are denoted by $c_{r0}, c_{r1}, c_{r2}, c_{r3}, \ldots, c_{r(K_r-1)}$, where r is the code block number, and $K_r$ is the number of bits in code block number r. The total number of code blocks is denoted by C and each code block can be individually turbo encoded. The encoded bits output from the channel coding block 415 are denoted by $d_{r0}^{(i)}, d_{r1}^{(i)}, d_{r2}^{(i)}, d_{r3}^{(i)}, \ldots, d_{r(D_r-1)}^{(i)}$, with 0, 1, and 2 and where $D_r$ is the number of bits on the i-th coded stream for code block number r (i.e., $D_r = K_r + 4$).

The transport channel 400 further includes a Rate matching block 420. Turbo coded blocks, from the channel coding block 415, are delivered to the rate matching block 420. The Turbo coded blocks Turbo coded blocks are denoted by $d_{r0}^{(i)}, d_{r1}^{(i)}, d_{r2}^{(i)}, d_{r3}^{(i)}, \ldots, d_{r(D_r-1)}^{(i)}$, with i=0, 1, and 2, and where r is the code block number, i is the coded stream index, and $D_r$ is the number of bits in each coded stream of code block number r. The total number of code blocks is denoted by C and each coded block can be individually rate matched. The bits output from the rate matching block 415 (i.e., after rate matching) are denoted by $e_{r0}, e_{r1}, e_{r2}, e_{r3}, \ldots, e_{r(E_r-1)}$, where r is the coded block number, and where $E_r$ is the number of rate matched bits for code block number r.

The transport channel 400 further includes a Code block concatenation block 425. The bits input to the code block concatenation block 425 are denoted by $e_{r0}, e_{r1}, e_{r2}, e_{r3}, \ldots, e_{r(E_r-1)}$ for $r=0, \ldots, C-1$ and where $E_r$ is the number of rate matched bits for the r-th code block. Code block concatenation is performed according to subclause 5.1.5 in 3GPP TS 36.212 v 8.5.0, "E-UTRA, Multiplexing and Channel coding", December 2008. The bits output from code block concatenation 425 are denoted by $f_0, f_1, f_2, f_3, \ldots, f_{G-1}$, where G is the total number of coded bits for transmission excluding the bits used for control transmission, when control information is multiplexed with the UL-SCH transmission.

Additionally, the transport channel 400 includes a number of channel coding units 430a-430n. Control data arrives at the coding units 430a-430n in the form of channel quality information (CQI and/or PMI), Hybrid Automatic Repeat Request-Acknowledgement (HARQ-ACK) and rank indication. Different coding rates for the control information can be achieved by allocating different number of coded symbols for its transmission. When control data are transmitted in the PUSCH, the channel coding 430a-430n for HARQ-ACK, rank indication and channel quality information $o_0, o_1, o_2, \ldots, o_{O-1}$ is performed independently.

For Time Division Duplex (TDD), two ACK/NACK feedback modes are supported by higher layer configuration:

ACK/NACK bundling; and

ACK/NACK multiplexing.

For TDD ACK/NACK bundling, the HARQ-ACK consists of one or two bits of information. For TDD ACK/NAK multiplexing, the HARQ-ACK consists of between one and four bits of information and the number of bits is determined as described in Section 7.3 in 3GPP TS 36.213 v8.5.0, "E-UTRA, Physical Layer Procedures", December 2008, the contents of which hereby are incorporated by reference in their entirety.

When SS 116 transmits HARQ-ACK bits or rank indicator bits, SS 116 can determine the number of coded symbols Q' for HARQ-ACK or rank indicator using Equation 1:

$$Q' = \min\left(\left\lceil \frac{O \cdot M_{sc}^{PUSCH} \cdot N_{symb}^{PUSCH} \cdot \beta_{offset}^{PUSCH}}{\sum_{r=0}^{C-1} K_r} \right\rceil, 4 \cdot M_{sc}^{PUSCH-current}\right) \quad \text{[Eqn. 1]}$$

In Equation 1, O is the number of ACK/NACK bits or rank indicator bits, $M_{sc}^{PUSCH-current}$ is the scheduled bandwidth for PUSCH transmission in the current sub-frame for the transport block, (also expressed as a number of subcarriers), and $N_{symb}^{PUSCH}$ is the number of SC-FDMA symbols per subframe for PUSCH transmission given by $N_{symb}^{PUSCH} = (2 \cdot (N_{symb}^{UL}-1) - N_{SRS})$, $N_{SRS}$ is equal to 1 if SS 116 is configured to send PUSCH and SRS in the same subframe or if the PUSCH resource allocation partially overlaps with the cell specific SRS subframe and bandwidth configuration defined in Section 5.5.3 of 3GPP TS 36.212 v 8.5.0, "E-UTRA, Multiplexing and Channel coding", December 2008. Otherwise $N_{SRS}$ is equal to 0. $M_{sc}^{PUSCH}$, $N_{symb}^{PUSCH}$, C, and $K_r$ can be obtained from the initial PDCCH for the same transport block.

For HARQ-ACK information $Q_{ACK} = Q_m \cdot Q'$ and $[\beta_{offset}^{PUSCH} = \beta_{offset}^{HARQ-ACK}]$, where $\beta_{offset}^{HARQ-ACK}$ may be determined according to 3GPP TS 36.213 v8.5.0, "E-UTRA, Physical Layer Procedures", December 2008.

For rank indication $Q_{RI} = Q_m \cdot Q'$ and $[\beta_{offset}^{PUSCH} = \beta_{offset}^{RI}]$, where $\beta_{offset}^{RI}$ may be determined according to 3GPP TS 36.213 v8.5.0, "E-UTRA, Physical Layer Procedures", December 2008.

For channel quality control information (CQI and/or PMI), when SS 116 transmits channel quality control information bits, SS 116 can determine the number of coded symbols Q' for channel quality information using Equation 2:

$$Q' = \min\left(\left\lceil \frac{(O+L) \cdot M_{sc}^{PUSCH} \cdot N_{symb}^{PUSCH} \cdot \beta_{offset}^{PUSCH}}{\sum_{r=0}^{C-1} K_r} \right\rceil, M_{sc}^{PUSCH-current} \cdot N_{symb}^{PUSCH-current} - \frac{Q_{RI}}{Q_m}\right) \quad \text{[Eqn. 2]}$$

In Equation 2, O is the number of CQI bits, L is the number of CRC bits given by $$L = \begin{cases} 0 & O \leq 11 \\ 8 & \text{otherwise,} \end{cases}$$

$Q_{CQI}=Q_m \cdot Q'$ and $[\beta_{offset}^{PUSCH}=\beta_{offset}^{CQI}]$, where $\beta_{offset}^{CQI}$ can be determined according to 3GPP TS 36.213 v8.5.0, "E-UTRA, Physical Layer Procedures", December 2008. If rank indicator is not transmitted then $Q_{RI}=0$. Further, $M_{sc}^{PUSCH}$, $N_{symb}^{PUSCH}$, C, and $K_r$ can be obtained from the initial PDCCH for the same transport block.

For UL-SCH data information $G=N_{symb}^{PUSCH\text{-}current} \cdot M_{sc}^{PUSCH\text{-}current} \cdot Q_m - Q_{CQI} - Q_{RI}$, where $M_{sc}^{PUSCH\text{-}current}$ is the scheduled bandwidth for PUSCH transmission in the current sub-frame for the transport block, and $N_{symb}^{PUSCH\text{-}current}$ is the number of SC-FDMA symbols in the current PUSCH transmission sub-frame given by $N_{symb}^{PUSCH\text{-}current}=(2 \cdot (N_{symb}^{UL}-1)-N_{SRS})$, $N_{SRS}$ is equal to '1' if SS 116 is configured to send PUSCH and SRS in the same subframe or if the PUSCH resource allocation partially overlaps with the cell specific SRS subframe and bandwidth configuration defined in Section 5.5.3 of 3GPP TS 36.212 v 8.5.0, "E-UTRA, Multiplexing and Channel coding", December 2008. Otherwise $N_{SRS}$ is equal to '0'.

If the payload size is less than or equal to eleven (11) bits, the channel coding of the channel quality information is performed according to subclause 5.2.2.6.4 of 3GPP TS 36.212 v 8.5.0, "E-UTRA, Multiplexing and Channel coding", December 2008, with input sequence $o_0, o_1, o_2, \ldots, o_{O-1}$.

For payload sizes greater than eleven (11) bits, the CRC attachment, channel coding and rate matching of the channel quality information is performed according to subclauses 5.1.1, 5.1.3.1 and 5.1.4.2, of 3GPP TS 36.212 v 8.5.0, "E-UTRA, Multiplexing and Channel coding", December 2008, respectively. The input bit sequence to the CRC attachment is $o_0, o_1, o_2, \ldots, o_{O-1}$. The output bit sequence of the CRC attachment operation is the input bit sequence to the channel coding operation. The output bit sequence of the channel coding operation is the input bit sequence to the rate matching operation.

The output sequence for the channel coding 430a-430n of channel quality information is denoted by $q_0, q_1, q_2, q_3, \ldots, q_{Q_{CQI}-1}$.

The transport channel 400 further includes a multiplexing of data and control information block 435. The control and data multiplexing 435 can be performed such that HARQ-ACK information is present on both slots and is mapped to resources around the demodulation reference signals. Additionally, the multiplexing ensures that control and data information are mapped to different modulation symbols.

The inputs to the data and control multiplexing 435 are the coded bits of the control information from channel coding 430a, denoted by $q_0, q_1, q_2, q_3, \ldots, q_{Q_{CQI}-1}$ and the coded bits of the UL-SCH from code block concatenation 425, denoted by $f_0, f_1, f_2, f_3, \ldots, f_{G-1}$. The output of the data and control multiplexing 435 operation is denoted by $\underline{g}_0, \underline{g}_1, \underline{g}_2, \underline{g}_3, \ldots, \underline{g}_{H'-1}$, where $H=(G+Q_{CQI})$ and $H'=H/Q_m$, and where $\underline{g}_i$, $i=0, \ldots, H'-1$ are column vectors of length $Q_m$. H is the total number of coded bits allocated for UL-SCH data and CQI/PMI information.

The control information and the data can be multiplexed as follows:

```
Set i, j, k to '0'
while j < Q_CQI -- first place the control information
    g_k = [q_j ... q_{j+Q_m-1}]^T
    j = j + Q_m
```

```
    k = k + 1
end while
while i < G -- then place the data
    g_k = [f_i ... f_{i+Q_m-1}]^T
    i = i + Q_m
    k = k + 1
end while
```

The transport channel 400 further includes a Channel interleaver 440. The channel interleaver 440 in conjunction with the resource element mapping for PUSCH can implement a time-first mapping of modulation symbols onto the transmit waveform while ensuring that the HARQ-ACK information may be present on both slots in the subframe and can be mapped to resources around the uplink demodulation reference signals.

The inputs to the channel interleaver 440 are denoted by $\underline{g}_0, \underline{g}_1, \underline{g}_2, \ldots, \underline{g}_{H'-1}$, $q_0^{RI}, q_1^{RI}, q_2^{RI}, \ldots, q_{Q'_{RI}-1}^{RI}$ and $q_0^{ACK}, q_1^{ACK}, q_2^{ACK}, \ldots, q_{Q'_{ACK}-1}^{ACK}$. The number of modulation symbols in the subframe is given by $H''=H'+Q'_{RI}$. The output bit sequence from the channel interleaver 440 can be derived as follows:

(1) $C_{mux}=N_{symb}^{PUSCH}$ is assigned to be the number of columns of the matrix. The columns of the matrix are numbered '0', '1', '2', $\ldots$, $C_{mux}-1$ from left to right.

(2) The number of rows of the matrix is $R_{mux}=(H'' \cdot Q_m)/C_{mux}$ and $R'_{mux}=R_{mux}/Q_m$.

The rows of the rectangular matrix are numbered '0', '1', '2', $\ldots$, $R_{mux}-1$ from top to bottom.

(3) If rank information is transmitted in this subframe, the vector sequence $q_0^{RI}, q_1^{RI}, q_2^{RI}, \ldots, q_{Q'_{RI}-1}^{RI}$ is written onto the columns indicated by Table 1, and by sets of $Q_m$ rows starting from the last row and moving upwards according to the following pseudocode.

```
Set i, j to 0.
Set r to R'_mux - 1
while i < Q'_RI
    c_RI = Column Set(j)
    y_{r×C_mux + c_RI} = q_i^RI
    i = i + 1
    r = R'_mux - 1 - ⌊i/4⌋
    j = (j + 3) mod 4
end while
```

Where ColumnSet is given in Table 1 and indexed left to right from '0' to '3'.

TABLE 1

Column set for Insertion of HARQ-ACK information

| CP configuration | SRS configuration | Column Set |
|---|---|---|
| Normal | No SRS | {2, 3, 8, 9} |
|  | First SC-FDMA symbol | {1, 2, 7, 8} |
|  | Last SC-FDMA symbol | {2, 3, 8, 9} |
| Extended | No SRS | {2, 3, 7, 8} |
|  | First SC-FDMA symbol | {1, 2, 6, 7} |
|  | Last SC-FDMA symbol | {2, 3, 7, 8} |

(4) Write the input vector sequence, i.e., $\underline{y}_k=\underline{g}_k$ for k=0, 1, $\ldots$, H'-1, into the ($R_{mux} \times C_{mux}$) matrix by sets of $Q_m$ rows starting with the vector $\underline{y}_0$ in column 0 and rows 0 to $(Q_m-1)$ and skipping the matrix entries that are already occupied:

$$\begin{bmatrix} \underline{y}_0 & \underline{y}_1 & \underline{y}_2 & \cdots & \underline{y}_{C_{mux}-1} \\ \underline{y}_{C_{mux}} & \underline{y}_{C_{mux}+1} & \underline{y}_{C_{mux}+2} & \cdots & \underline{y}_{2C_{mux}-1} \\ \vdots & \vdots & \vdots & \ddots & \vdots \\ \underline{y}_{(R'_{mux}-1) \times C_{mux}} & \underline{y}_{(R'_{mux}-1) \times C_{mux}+1} & \underline{y}_{(R'_{mux}-1) \times C_{mux}+2} & \cdots & \underline{y}_{(R'_{mux} \times C_{mux}-1)} \end{bmatrix}$$

(5) If HARQ-ACK information is transmitted in this subframe, the vector sequence $\underline{q}_0^{ACK}, \underline{q}_1^{ACK}, \underline{q}_2^{ACK}, \ldots, \underline{q}_{Q'_{ACK}-1}^{ACK}$ is written onto the columns indicated by Table 2, and by sets of $Q_m$ rows starting from the last row and moving upwards according to the following pseudocode. Note that this operation can overwrite some of the channel interleaver entries obtained in step (4).

```
Set i, j to 0.
Set r to R'_mux −1
while i < Q'_ACK
    c_ACK = ColumnSet(j)
    y_(r×C_mux) + c_ACK = q_i^ACK
    i = i + 1
    r = R'_mux −1−⌊i/4⌋
    j = (j + 3) mod 4
end while
```

Where ColumnSet is given in Table 5.2.2.8-2 in 3GPP TS 36.212 v 8.5.0, "E-UTRA, Multiplexing and Channel coding", December 2008 and indexed left to right from '0' to '3'.

(6) The output of the block interleaver is the bit sequence read out column by column from the $(R_{mux} \times C_{mux})$ matrix. The bits after channel interleaving are denoted by $h_0, h_1, h_2, \ldots, h_{H+Q_{RI}-1}$.

In some embodiments, data and control information such as Channel Quality Information (CQI), Rank Information (RI), Ack/Nack (A/N) information can be transmitted simultaneously when the MIMO scheme is used in the uplink communication. In embodiments of the present disclosure, the Uplink Control Information (also referred hereinafter as "UCI" for all three types of uplink control information) can be generated for a single component carrier or multiple component carriers in the case of Carrier aggregation in systems such as LTE-advanced.

Figure 5:
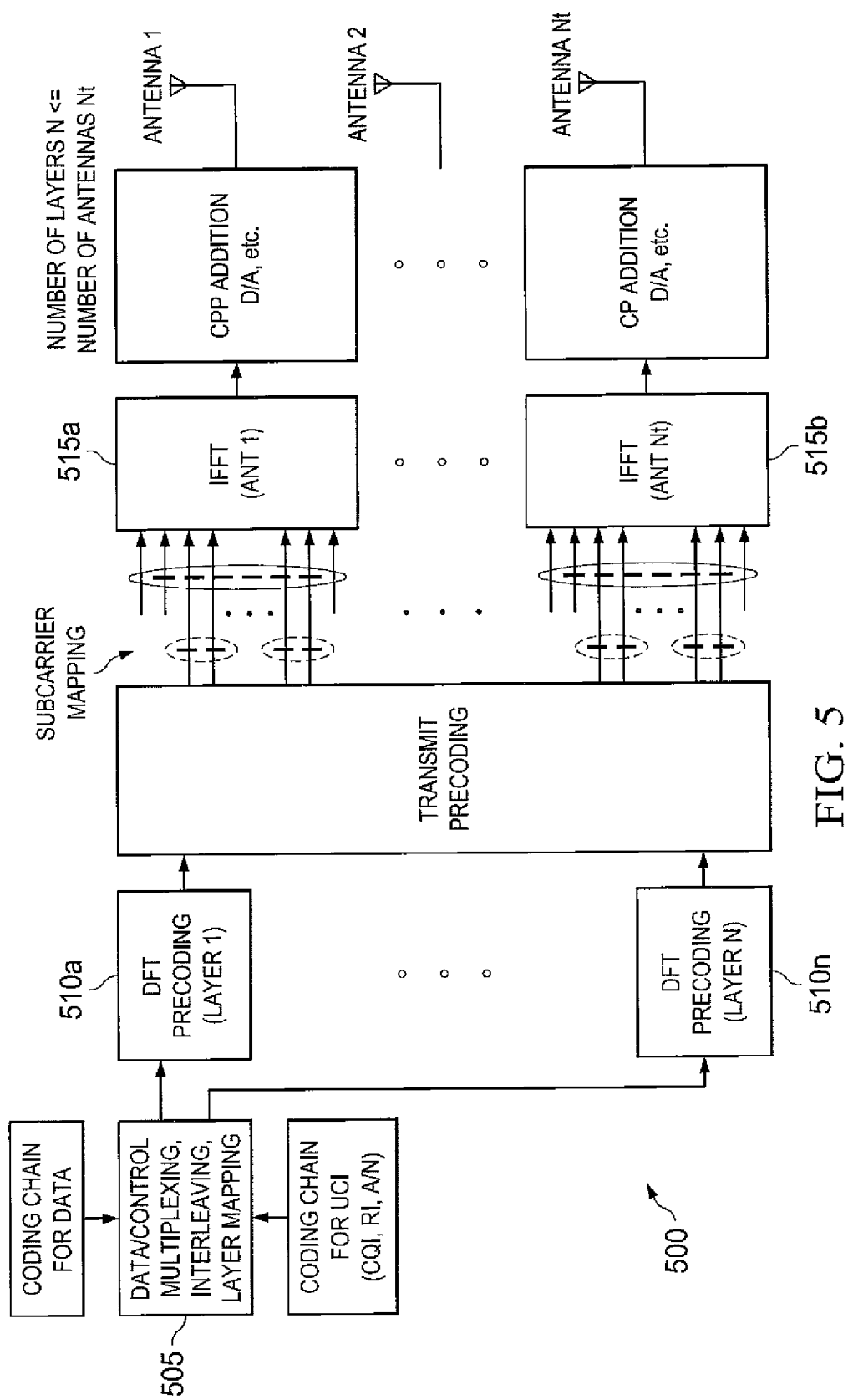
FIG. 5 illustrates an uplink transmission chain for Nt transmit antenna for N layer transmissions according to embodiments of the present disclosure.

FIG. 5 illustrates an uplink transmission chain for Nt transmit antenna for N layer transmissions according to embodiments of the present disclosure. The embodiment of the uplink transmission chain 500 shown in FIG. 5 is for illustration only. Other embodiments could be used without departing from the scope of this disclosure.

The uplink transmission chain 500 is operable to provide a generic N layer transmission when SS 116 includes Nt transmit antenna. The uplink transmission chain 500 includes a Data/Control Multiplexing, interleaving layer mapping block 505 (herein after referred to as layer mapping 505). The layer mapping 505 is performed before DFT preceding 510, so that the data and control information are properly multiplexed and interleaved. The transmit precoding is performed between the DFT precoders 510a-510n and IFFTs 515a-515b to transform, on a per-subcarrier basic, an N dimension signal at the output of the DFT precoders 510a-510n to an Nt dimensional signal as an input to the group of IFFTs 515a-515b. The subcarrier mapping at the input of IFFTs can include non-contiguous segments of subcarriers.

Figure 6:
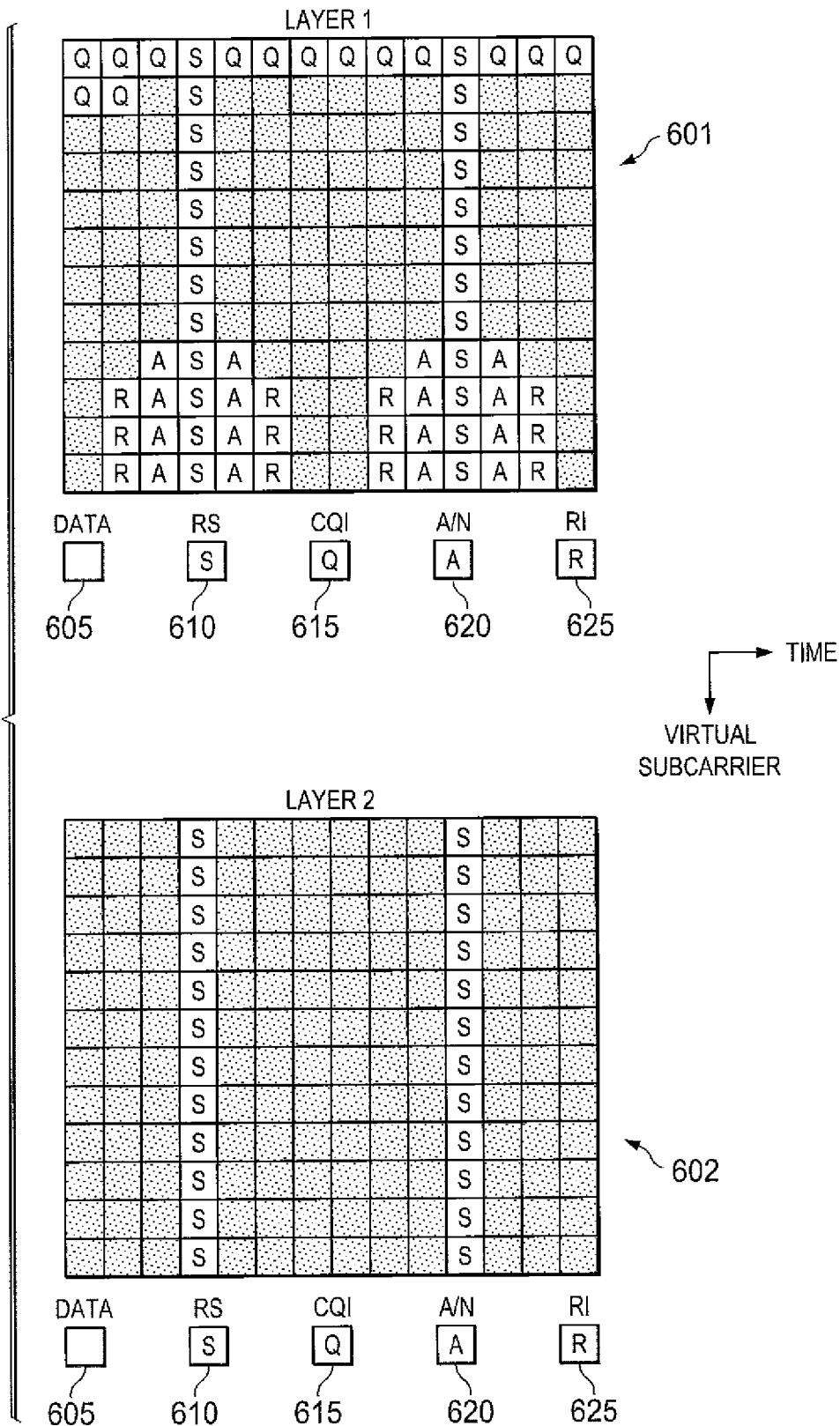
FIGS. 6-9 illustrate graphs for transmitting data and control information according to embodiments of the present disclosure.

FIG. 6 illustrates graphs for transmitting data and control information according to embodiments of the present disclosure. The embodiment of the graphs 600 shown in FIG. 6 are for illustration only. Other embodiments could be used without departing from the scope of this disclosure.

In some embodiments, the uplink control information, including CQI, RI and A/N bits, is carried on only one of the layers. For example, as shown in FIG. 6, the transmission may be performed using at least two (2) layers, i.e., a first layer 601 and a second layer 602. The first layer 601 is the first indexed layer and the second layer is the second indexed layer as defined according to the 3GPP TS 36.211 v 8.5.0, "E-UTRA, Physical channels and modulation", December 2008, the contents of which hereby are incorporated by reference in their entirety. The layer carrying the uplink control information, which can be all the uplink control information including CQI, RI and A/N bits, can be selected using a number of methods. In the following examples, N denotes the total number of transmission layers.

In a first method of selecting the carrying layer (i.e., the layer carrying the uplink control information), if the Modulation and Coding Scheme (MCS) used by the N layers are different, then the layer that has the largest MCS value is selected to carry the uplink control information such as, but not limited to, CQI, RI and A/N. The MCS values typically are carried in the UL schedule assignment grant sent by BS 102 to SS 116. SS 116, therefore is aware (e.g., knows), at the time of this data and control transmission, which layer includes the largest MCS value.

For example, the first layer 601 has the highest MCS value; therefore, the first layer 601 is selected as the carrying layer. Thus, the first layer 601 carries the uplink control information such as, but not limited to, CQI, RI and A/N.

The control region size is defined as the number of Resource Elements (RE) transmitted within the respective region. For example, in FIG. 6, the CQI 615 control region size is illustrated with the blocks with the letters "Q", the RI 625 size illustrated with the letters "R", and A/N 620 size illustrated with the letters "A" and so forth.

In a second method, if the MCS used by the N layers are the same, then the first layer is chosen to carry the uplink control information such as, but not limited to, the CQI, RI and A/N. This could be suitable for situations where techniques such as layer mixing/layer permutation are used to ensure the same channel quality and therefore the same MCS values on all the layers.

Furthermore, the choice of layer could also be explicitly signaled in the uplink scheduling grant as an additional control field, using either DCI format '0' or some other uplink grant DCI format.

Additionally, the sizes of the three control regions (CQI 615, RI 625, A/N 620) can be determined as a function of the corresponding Uplink Control Information (UCI) size and the MCS value associated with the first layer 601, e.g., the layer on which the control regions are transmitted, as well as a higher layer signaled offset. The calculation of control region sizes is given below.

For example, if all the layers include the same MCS (e.g., such as, but not limited to, a single Codeword (CW) solution is used in the UL MIMO with layer permutation/mixing), then the control region equation for HARQ and RI bits is defined by Equation 3:

$$Q' = \min\left(\left\lceil \frac{O \cdot M_{sc}^{PUSCH} \cdot N_{offset}^{PUSCH} \cdot \beta_{offset}^{PUSCH} \cdot N}{\sum_{n=1}^{N} \sum_{r=0}^{C(n)-1} K_{r,n}} \right\rceil, 4 \cdot M_{sc}^{PUSCH-current}\right).$$ [Eqn. 3]

In Equation 3, the inclusion of the factor "N", which denotes the number of layers, in the numerator; and the sum in the denominator will be over all code blocks (CBs) in all layers. Here C(n) denotes the number of CBs in layer n, and $K_{r,n}$ denotes the size of the rth CB in layer n. Similarly the control region equation for CQI bits is defined by Equation 4:

$$Q' = \min\left(\left\lceil \frac{(O+L) \cdot M_{sc}^{PUSCH} \cdot N_{offset}^{PUSCH} \cdot \beta_{offset}^{PUSCH} \cdot N}{\sum_{n=1}^{N}\sum_{r=0}^{C(n)-1} K_{r,n}} \right\rceil, \quad M_{sc}^{PUSCH-current} \cdot N_{symb}^{PUSCH-current} - \frac{Q_{RI}}{Q_m}\right)$$ [Eqn. 4]

For another example, if the MCS on the layers are different and the $p^{th}$ layer is selected to be the layer on which UCI is transmitted, then Equations 3 and 4 are amended to Equations 5 for RI and A/N bits and Equation 6 for CQI bits:

$$Q' = \min\left(\left\lceil \frac{O \cdot M_{sc}^{PUSCH} \cdot N_{offset}^{PUSCH} \cdot \beta_{offset}^{PUSCH}}{\sum_{r=0}^{C(p)-1} K_{r,n}} \right\rceil, \quad 4 \cdot M_{sc}^{PUSCH-current}\right)$$ [Eqn. 5]

and $$Q' = \min\left(\left\lceil \frac{(O+L) \cdot M_{sc}^{PUSCH} \cdot N_{offset}^{PUSCH} \cdot \beta_{offset}^{PUSCH}}{\sum_{r=0}^{C(p)-1} K_{r,n}} \right\rceil, \quad M_{sc}^{PUSCH-current} \cdot N_{symb}^{PUSCH-current} - \frac{Q_{RI}}{Q_m}\right)$$ [Eqn. 6]

This above approach is illustrated in FIG. 6 for a N=2 two-layer transmission, where the first layer 601 is selected to carry the uplink control information, and only data and RS are transmitted on the second layer 602. While all three control regions are shown in FIG. 6, in a given subframe only a subset of these three regions may be included, e.g., only CQI 615 and RI 625 but no A/N 620.

In some embodiments wherein the uplink control information is carried in one layer, the carrying layer can be varied or alternated. For example, in a first transmission, the first layer 601 is selected to carry the uplink control information, including the CQI 615, RI 625 and A/N 620. The first layer 601 may be been randomly selected, selected as a result of the first layer 601 having the largest MCS value, or selected using some other criterion. For the first re-transmission corresponding to the same HARQ process ID, and N=2, the uplink control information is carried on the second layer 602. In a second re-transmission corresponding to the same HARQ process ID, and N=2, the uplink control information is carried on the first layer 601, and so forth.

Figure 7:
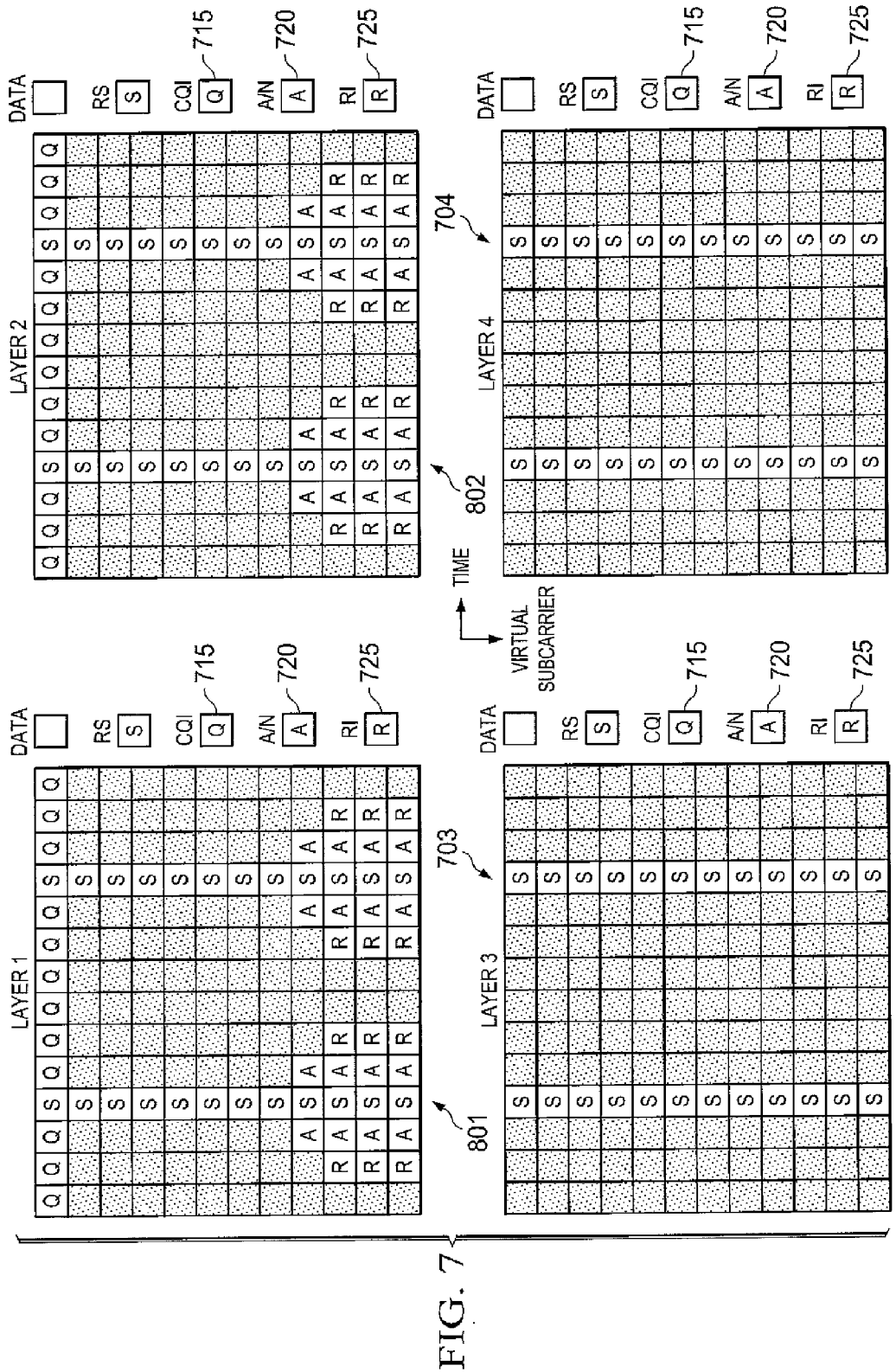

FIG. 7 illustrates graphs for transmitting data and control information according to embodiments of the present disclosure. The embodiment of the graphs 700 shown in FIG. 7 are for illustration only. Other embodiments could be used without departing from the scope of this disclosure.

In some embodiments of the present disclosure, the uplink control information is mapped to a subset (referred to as Ns) of the N layers that are transmitted on the uplink in a MIMO uplink subframe. The size of the subset (Ns) can be less than or equal to the total number of layers in the uplink transmission (i.e., Ns≤N).

If the subset size Ns is less than N (i.e., Ns<N), then SS 116 can be informed, or become aware of, the layers used for uplink control transmission according to one of the following methods.

In a first method of informing SS 116 regarding the subset (Ns) of layers that will carry the uplink control information, the subset of layers (Ns) used for uplink control information can be explicitly signaled in the uplink scheduling grant as an additional control field. Using either DCI format '0' or some other uplink grant DCI format, BS 102 explicitly informs SS 116 regarding the subset of layer (Ns).

In a second method wherein SS 116 identifies the subset (Ns) of layers that will carry the uplink control information, SS 116 implicitly infers the subset of layers (Ns). SS 116 can implicitly inform the subset of layers (Ns) according any one or more of: (1) a number of codewords; (2) codeword to layer mapping structure; and (3) a codeword that uses highest MCS value.

For example, if N=4 and the first layer 701 and second layer 702 are used for codeword_1 transmission while a third layer 703 and a fourth layer 704 are used for codeword_2 transmission, and if the MCS used by codeword_1 is better than the MCS used by codeword_2, then SS 116 can decide to transmit uplink control information on the first layer 701 and second layer 701. SS 116 can select the first layer 701 and second layer 701 as the carrying layers since the first layer 701 and second layer 701 correspond to the layers with the better MCS.

Figure 8:
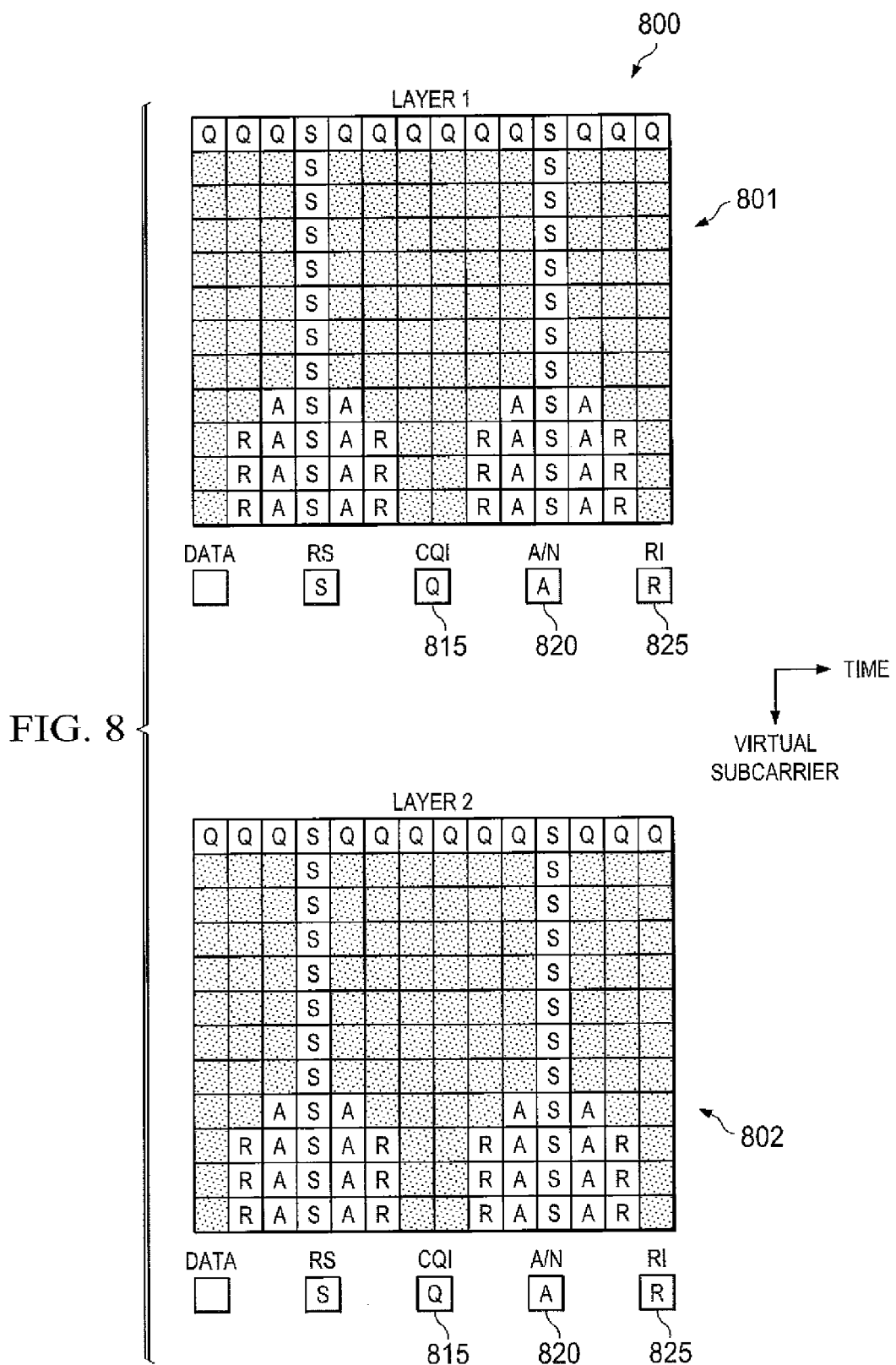

FIG. 8 illustrates graphs for transmitting data and control information according to embodiments of the present disclosure. The embodiment of the graphs 800 shown in FIG. 8 are for illustration only. Other embodiments could be used without departing from the scope of this disclosure.

Additionally, SS 116 can be configured to determine the uplink control regions by following one of the following rules. It is noted that the subset of layers (Ns) that contain control information also are referred herein as "active layers."

FIG. 8 illustrates embodiments wherein the active layers include all the layers in the uplink transmission. For example, the transmission may include a first layer 801 and a second layer 802. Accordingly, N=2. Further, the active layer may include the first layer 801 and the second layer 802. Accordingly, Ns=2. It will be understood that although only two layers are illustrated in FIG. 8, embodiments with more than two layers could be used without departing from the scope of this disclosure.

In a first example, if the active layers (e.g., the first layer 801 and second layer 801 carrying the uplink control information) used for uplink control transmission include the same MOS, then the total size of each control region (CQI 815, RI 825, A/N 820) across the active layers 801, 802 is determined as a function of the corresponding uplink control information size and this single MCS value. Further, the control information can be distributed evenly across the active layers 801, 802, where each layer receives roughly 1/Ns of the total control region size. This could be suitable for situations where techniques such as layer mixing/layer permutation are used to ensure the same channel quality and therefore the same MCS values on all the layers. For example, the first layer 801 receives ½ (i.e., 1/Ns) the uplink control information and the second layer 802 receives ½ the uplink control information.

In a second example, if the active layers (e.g., the first layer 801 and second layer 801 carrying the uplink control information) include different MCS in their transmissions, then two alternatives can apply.

In a first alternative embodiment, for each active layer 801, 802, a per-layer control region size is determined according to the UCI size and the MCS on that particular layer. The total size of the control region is the sum of the per-layer control region sizes over the active layers 801, 802. The control information is then distributed to the active layers 801, 802, according to the per-layer control region size.

In a second alternative embodiment, one example of determining the overall control region size can be given by Equations 7 and 8:

$$Q'(n) = \min\left(\left\lceil \frac{O \cdot M_{sc}^{PUSCH} \cdot N_{offset}^{PUSCH} \cdot \beta_{offset}^{PUSCH}}{\sum_{r=0}^{C(n)-1} K_{r,n}} \right\rceil, 4 \cdot M_{sc}^{PUSCH-current}\right), \quad [\text{Eqn. 7}]$$

for $n = 1, \ldots N_s$

In Equation 7, $Q'(n)$ is the number of RI and A/N symbols in the nth active layer.

$$Q'(n) = \min\left(\left\lceil \frac{(O+L) \cdot M_{sc}^{PUSCH} \cdot N_{offset}^{PUSCH} \cdot \beta_{offset}^{PUSCH}}{\sum_{r=0}^{C(n)-1} K_{r,n}} \right\rceil, \right. \quad [\text{Eqn. 8}]$$

$$\left. 4 \cdot M_{sc}^{PUSCH-current} \cdot N_{symb}^{PUSCH-current} - \frac{Q_{RI}(n)}{Q_m}\right)$$

In Equation 8, $Q'(n)$ is the number of CQI symbols in the nth active layer, and $Q_{RI}(n)$ is the number of RI symbols allocated on this active layer.

In such second alternative embodiment, the size of the total control region is jointly determined as a function of the UCI size and the MCSs on the active layers 801, 802, and the control information is distributed evenly across the active layers 801, 802, where each layer (e.g., the first layer 801 and second layer 802) gets roughly 1/Ns of the total control region size.

For both alternative embodiments, one example of determining the overall control region size can be given by Equations 9 for RI and A/N bits and Equation 10 for CQI bits:

$$Q' = \min\left(\left\lceil \frac{O \cdot M_{sc}^{PUSCH} \cdot N_{offset}^{PUSCH} \cdot \beta_{offset}^{PUSCH} \cdot N_s}{\sum_{n=1}^{N_S} \sum_{r=0}^{C(n)-1} K_{r,n}} \right\rceil, \right. \quad [\text{Eqn. 9}]$$

$$\left. 4 \cdot M_{sc}^{PUSCH-current} \cdot N_s\right)$$

The first summation on the denominator is summed over all active layers.

$$Q' = \min\left(\left\lceil \frac{(O+L) \cdot M_{sc}^{PUSCH} \cdot N_{offset}^{PUSCH} \cdot \beta_{offset}^{PUSCH} \cdot N_s}{\sum_{n=1}^{N_S} \sum_{r=0}^{C(n)-1} K_{r,n}} \right\rceil, \right. \quad [\text{Eqn. 10}]$$

$$\left. M_{sc}^{PUSCH-current} \cdot N_{symb}^{PUSCH-current} \cdot N_s - \frac{Q_{RI}}{Q_m}\right)$$

Furthermore, in some embodiments of the first and second alternatives, filler symbols are added to assist in evenly distributing the UCI across the active layers 801, 802. For example, using Equation 11:

$$Q'' = N_s \cdot \left\lceil \frac{Q'}{N_s} \right\rceil \quad [\text{Eqn. 11}]$$

And assigning Q″ as the total number of UCI symbols. A total of Q″–Q′ null filler symbols are added to assist the correctness of rate matching.

Figure 9:
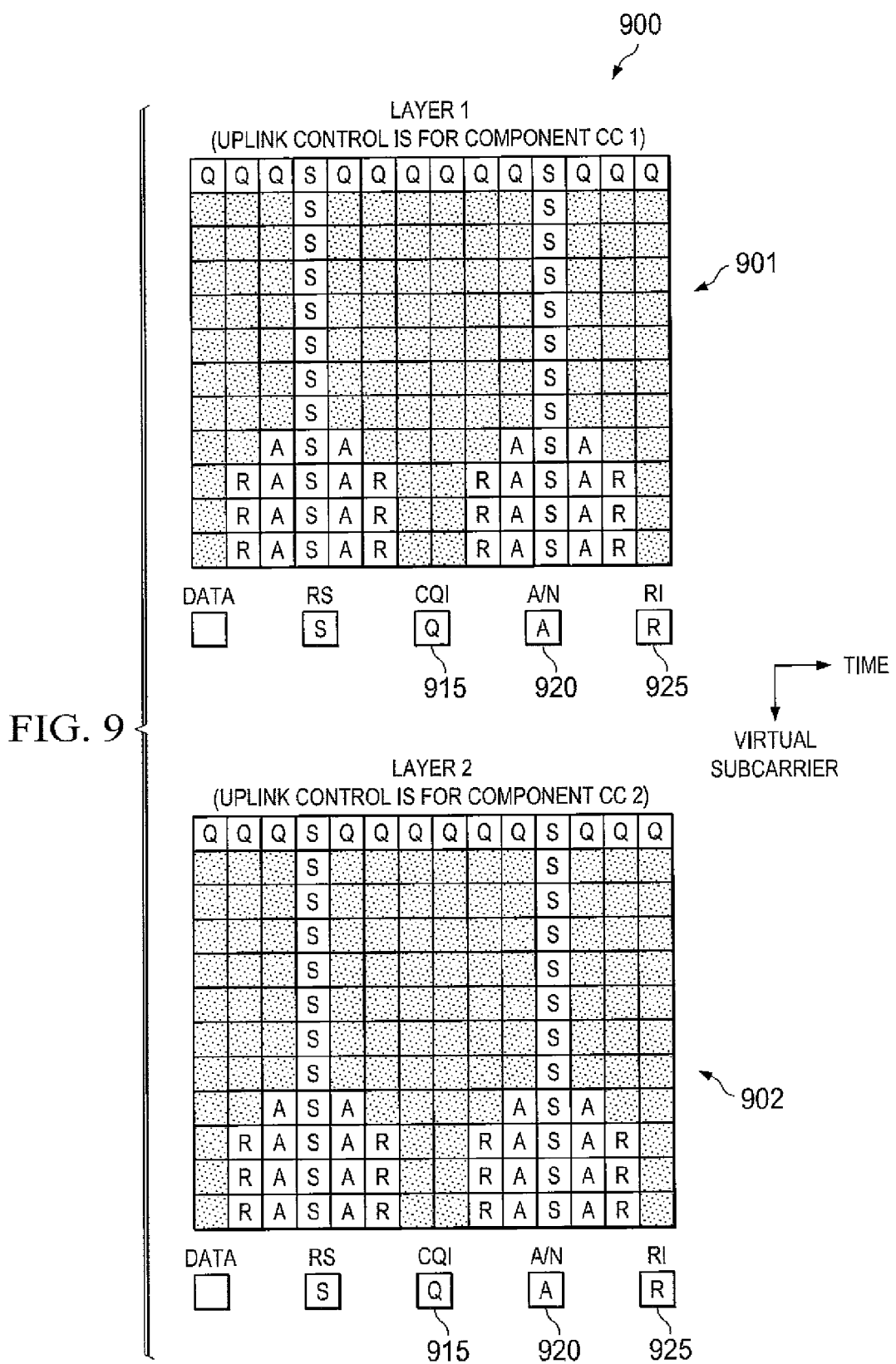

FIG. 9 illustrates graphs for transmitting data and control information according to embodiments of the present disclosure. The embodiment of the graphs 900 shown in FIG. 9 are for illustration only. Other embodiments could be used without departing from the scope of this disclosure.

In some embodiment of the present disclosure wherein uplink control information for more than one Component Carriers (CC) are transmitted in the uplink in a multi-layer uplink transmission, the UCI for each component carrier is transmitted on a separate layer. The size of the control region for each layer 901, 902 can be dependent on the UCI size of the corresponding CC, as well as the MCS value on this layer.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a mobile station configured to communicate via an uplink transmission to at least one base station in a Multiple Input Multiple Output wireless network, the mobile station comprising:
   a plurality of transmit antennas; and
   a transmitter coupled to the plurality of transmit antennas, the transmitter comprising:
      a layer mapper configured to map data and uplink control information to at least one layer and select a subset of the layers to simultaneously transmit the uplink control information,
      a plurality of Discrete Fourier Transform (DFT) units configured to perform DFT precoding, wherein the mapping is performed prior to the DFT precoding such that the data and uplink control information are multiplexed and interleaved,
      a transmit precoding unit configured to perform sub-carrier mapping to outputs of respective ones of the plurality of DFT units, and
      a plurality of Inverse Fast Fourier Transform (IFFT) units coupled to the transmit precoding unit and respective ones of the plurality of antennas, wherein the transmitter is configured to simultaneously transmit the data and uplink control information on the at least one layer, wherein the uplink transmission comprises at least two component carriers and wherein uplink control information for each of the at least two component carriers is mapped and transmitted separately within the subset of layers.

2. The mobile station of claim 1, wherein the at least one layer is at least one of:
   a layer with a modulation and coding scheme corresponding to a highest spectral efficiency among all layers; and
   a first indexed layer among all layers.

3. The mobile station of claim 1, wherein the data and uplink control information is distributed evenly across the subset of layers.

4. The mobile station of claim 1, wherein the subset of layers is explicitly signaled in an uplink scheduling grant.

5. The mobile station of claim 1, wherein the subset of layers is determined based on at least one of:
   a number of codewords;
   a codeword to layer mapping structure; and
   a codeword that uses a modulation and coding scheme corresponding to a highest spectral efficiency among all layers.

6. For use in a wireless communication network, a mobile station configured to communicate via an uplink transmission to at least one base station in a Multiple Input Multiple Output wireless network, the mobile station comprising:
   a plurality of transmit antennas; and
   a transmitter coupled to the plurality of transmit antennas, the transmitter comprising:
      a layer mapper configured to map data and uplink control information to at least one layer and select at least one layer to simultaneously transmit the uplink control information, wherein the selection of the at least one layer is explicitly signaled in an uplink scheduling grant,
      a plurality of Discrete Fourier Transform (DFT) units configured to perform DFT precoding, wherein the mapping is performed prior to the DFT precoding such that the data and uplink control information are multiplexed and interleaved,
      a transmit precoding unit configured to perform subcarrier mapping to outputs of respective ones of the plurality of DFT units, and
   a plurality of Inverse Fast Fourier Transform (IFFT) units coupled to the transmit precoding unit and respective ones of the plurality of antennas, wherein the transmitter is configured to simultaneously transmit the data and uplink control information on the at least one layer, wherein, when the at least one layer is the first indexed layer, a control region size in the at least one layer is defined by at least one of:

where Q' is one of a number of coded symbols for HARQ-ACK and rank indicator, O is one of a number of ACK/NACK bits and rank indicator bits, L is a number of CRC bits, $M_{sc}^{PUSCH}$ is the scheduled bandwidth for a physical uplink shared channel (PUSCH) transmission, $M_{sc}^{PUSCH-current}$ is the scheduled bandwidth for PUSCH transmission in the current sub-frame for a transport block, $N_{symb}^{PUSCH}$ is a number of SC-FDMA symbols per subframe, $N_{symb}^{PUSCH-current}$ is a number of SC-FDMA symbols per subframe for PUSCH transmission in the current sub-frame for the transport block, $\beta_{offset}^{PUSCH}$ is an offset, $Q_{RI}$ corresponds to a rank indicator, $Q_m$, is a number of symbols, N denotes a number of layers, C(n) denotes a number of code blocks (CB) in layer n, and $K_{r,n}$ denotes a size of the rth CB in layer n.

7. For use in a wireless communication network, a mobile station configured to communicate via an uplink transmission to at least one base station in a Multiple Input Multiple Output wireless network, the mobile station comprising:
   a plurality of transmit antennas; and
   a transmitter coupled to the plurality of transmit antennas, the transmitter comprising:
      a layer mapper configured to map data and uplink control information to at least one layer and select at least one layer to simultaneously transmit the uplink control information, wherein the selection of the at least one layer is explicitly signaled in an uplink scheduling grant,
      a plurality of Discrete Fourier Transform (DFT) units configured to perform DFT precoding, wherein the mapping is performed prior to the DFT precoding such that the data and uplink control information are multiplexed and interleaved,
      a transmit precoding unit configured to perform subcarrier mapping to outputs of respective ones of the plurality of DFT units, and
      a plurality of Inverse Fast Fourier Transform (IFFT) units coupled to the transmit precoding unit and respective ones of the plurality of antennas, wherein the transmitter is configured to simultaneously transmit the data and uplink control information on the at least one layer, wherein, when the at least one layer is the layer with the modulation and coding scheme corresponding to a highest spectral efficiency among all layers, a control region size in the at least one layer is defined by at least one of:

$$Q' = \min\left(\left\lceil \frac{O \cdot M_{sc}^{PUSCH} \cdot N_{offset}^{PUSCH} \cdot \beta_{offset}^{PUSCH} \cdot N}{\sum_{n=1}^{N} \sum_{r=0}^{C(n)-1} K_{r,n}} \right\rceil, 4 \cdot M_{sc}^{PUSCH-current}\right),$$

and $$Q' = \min\left(\left\lceil \frac{(O+L) \cdot M_{sc}^{PUSCH} \cdot N_{offset}^{PUSCH} \cdot \beta_{offset}^{PUSCH} \cdot N}{\sum_{n=1}^{N} \sum_{r=0}^{C(n)-1} K_{r,n}} \right\rceil, M_{sc}^{PUSCH-current} \cdot N_{symb}^{PUSCH-current} - \frac{Q_{RI}}{Q_m}\right),$$

$$Q' = \min\left(\left\lceil \frac{O \cdot M_{sc}^{PUSCH} \cdot N_{offset}^{PUSCH} \cdot \beta_{offset}^{PUSCH}}{\sum_{r=0}^{C(p)-1} K_{r,n}} \right\rceil, 4 \cdot M_{sc}^{PUSCH-current} \right)$$

and $$Q' = \min\left(\left\lceil \frac{(O+L) \cdot M_{sc}^{PUSCH} \cdot N_{offset}^{PUSCH} \cdot \beta_{offset}^{PUSCH}}{\sum_{r=0}^{C(p)-1} K_{r,n}} \right\rceil, M_{sc}^{PUSCH-current} \cdot N_{symb}^{PUSCH-current} - \frac{Q_{RI}}{Q_m} \right)$$

where Q' is one of a number of coded symbols for HARQ-ACK and rank indicator, O is one of a number of ACK/NACK bits and rank indicator bits, L is a number of CRC bits, $M_{sc}^{PUSCH}$ is the scheduled bandwidth for a physical uplink shared channel (PUSCH) transmission, $M_{sc}^{PUSCH-current}$ is the scheduled bandwidth for PUSCH transmission in the current sub-frame for a transport block, $N_{symb}^{PUSCH}$ is a number of SC-FDMA symbols per subframe, $N_{sc}^{PUSCH-current}$ is a number of SC-FDMA symbols per subframe for PUSCH transmission in the current sub-frame for the transport block, $\beta_{offset}^{PUSCH}$ is an offset, $Q_{RI}$ corresponds to a rank indicator, $Q_m$ is a number of symbols, N denotes a number of layers, C(n) denotes a number of code blocks (CB) in layer n, and $K_{r,n}$ denotes a size of the rth CB in layer n.

8. For use in a Multiple Input Multiple Output wireless network, a method for communicating uplink control information via an uplink transmission, the method comprising:
a plurality of Discrete Fourier Transform (DFT) units mapping data and uplink control information to a subset of layers, the mapping performed prior to DFT precoding such that the data and uplink control information are multiplexed and interleaved; then
a transmit precoding unit performing sub-carrier mapping to DFT precoded signals; and then
a plurality of Inverse Fast Fourier Transforms (IFFT) units simultaneously transmitting the data and uplink control information on the subset of layers, wherein the uplink transmission comprises at least two component carriers and wherein the step of mapping comprises mapping the uplink control information for each of the at least two component carriers separately within the subset of layers.

9. The method of claim 8, further comprising receiving signaling for the selection of the at least one layer via an uplink scheduling grant.

10. The method of claim 8, wherein mapping further comprises alternately mapping the data and uplink control information to different said layers such that one said layer is a first layer during a first transmission and a second layer during a first re-transmission.

11. The method of claim 8, wherein mapping further comprises selecting the subset of layers to simultaneously transmit the data and uplink control information based on at least one of a modulation and coding scheme; and an order of the layers.

12. The method of claim 8, wherein the data and uplink control information is distributed evenly across the subset of layers.

13. The method of claim 8, wherein mapping the data and uplink control information to the subset of layers further comprises receiving signaling for the selection of the subset of layers in an uplink scheduling grant.

14. The method of claim 8, mapping the data and uplink control information to a subset of layers further comprises determining the subset of layers based on at least one of:
a number of codewords;
a codeword to layer mapping structure; and
a codeword that uses a modulation and coding scheme corresponding to a highest spectral efficiency among all layers.

15. For use in a Multiple Input Multiple Output wireless network, a method for communicating uplink control information via an uplink transmission, the method comprising:
mapping data and uplink control information to at least one layer, the mapping performed prior to DFT precoding such that the data and uplink control information are multiplexed and interleaved, wherein mapping further comprises selecting the at least one layer to simultaneously transmit the data and uplink control information based on at least one of a modulation and coding scheme; and an order of the layers;
performing sub-carrier mapping to DFT precoded signals; and
simultaneously transmitting the data and uplink control information on the at least one layer wherein, when the at least one layer is a first indexed layer, a control region size in the at least one layer is defined by at least one of:

$$Q' = \min\left(\left\lceil \frac{O \cdot M_{sc}^{PUSCH} \cdot N_{offset}^{PUSCH} \cdot \beta_{offset}^{PUSCH} \cdot N}{\sum_{n=1}^{N}\sum_{r=0}^{C(n)-1} K_{r,n}} \right\rceil, 4 \cdot M_{sc}^{PUSCH-current} \right),$$

and $$Q' = \min\left(\left\lceil \frac{(O+L) \cdot M_{sc}^{PUSCH} \cdot N_{offset}^{PUSCH} \cdot \beta_{offset}^{PUSCH} \cdot N}{\sum_{n=1}^{N}\sum_{r=0}^{C(n)-1} K_{r,n}} \right\rceil, M_{sc}^{PUSCH-current} \cdot N_{symb}^{PUSCH-current} - \frac{Q_{RI}}{Q_m} \right)$$

where Q' is one of a number of coded symbols for HARQ-ACK and rank indicator, O is one of a number of ACK/NACK bits and rank indicator bits, L is a number of CRC bits, $M_{sc}^{PUSCH}$ is the scheduled bandwidth for a physical uplink shared channel (PUSCH) transmission, $M_{sc}^{PUSCH-current}$ is the scheduled bandwidth for PUSCH transmission in the current sub-frame for a transport block, $N_{symb}^{PUSCH}$ is number SC-FDMA symbols per subframe, $N_{symb}^{PUSCH-current}$ is a number of SC-FDMA symbols per subframe for PUSCH transmission in the current sub-frame for the transport block, $\beta_{offset}^{PUSCH}$ is an offset, $Q_{RI}$ corresponds to a rank indicator, $Q_m$ is a number of symbols, N denotes a number of layers, C(n) denotes a number of code blocks (CB) in layer n, and $K_{r,n}$ denotes a size of the rth CB in layer n.

16. For use in a Multiple Input Multiple Output wireless network, a method for communicating uplink control information via an uplink transmission, the method comprising:

mapping data and uplink control information to at least one layer, the mapping performed prior to DFT precoding such that the data and uplink control information are multiplexed and interleaved, wherein mapping further comprises selecting the at least one layer to simultaneously transmit the data and uplink control information based on at least one of a modulation and coding scheme; and an order of the layers;

performing sub-carrier mapping to DFT precoded signals; and simultaneously transmitting the data and uplink control information on the at least one layer wherein, when the at least one layer is a layer with a modulation and coding scheme corresponding to a highest spectral efficiency among all layers, a control region size in the at least one layer is defined by at least one of:

$$Q' = \min\left(\left\lceil \frac{O \cdot M_{sc}^{PUSCH} \cdot N_{offset}^{PUSCH} \cdot \beta_{offset}^{PUSCH}}{\sum_{r=0}^{C(p)-1} K_{r,n}} \right\rceil, 4 \cdot M_{sc}^{PUSCH-current}\right),$$

and $$Q' = \min\left(\left\lceil \frac{(O+L) \cdot M_{sc}^{PUSCH} \cdot N_{offset}^{PUSCH} \cdot \beta_{offset}^{PUSCH}}{\sum_{r=0}^{C(p)-1} K_{r,n}} \right\rceil, M_{sc}^{PUSCH-current} \cdot N_{symb}^{PUSCH-current} - \frac{Q_{RI}}{Q_m}\right),$$

where Q' is one of a number of coded symbols for HARQ-ACK and rank indicator, O is one of a number of ACK/NACK bits and rank indicator bits, L is a number of CRC bits, $M_{sc}^{PUSCH}$ is the scheduled bandwidth for a physical uplink shared channel (PUSCH) transmission, $M_{sc}^{PUSCH-current}$ is the scheduled bandwidth for PUSCH transmission in the current sub-frame for a transport block, $N_{symb}^{PUSCH}$ is a number of SC-FDMA symbols per subframe, $N_{symb}^{PUSCH-current}$ is a number of SC-FDMA symbols per subframe for PUSCH transmission in the current sub-frame for the trans ort block, $\beta_{offset}^{PUSCH}$ is an offset, $Q_{RI}$ corresponds to a rank indicator, $Q_m$ is a number of symbols, N denotes a number of layers, C(n) denotes a number of code blocks (CB) in layer n, and $K_{r,n}$ denotes a size of the rth CB in layer n.

* * * * *